(12) United States Patent
Yu

(10) Patent No.: US 11,212,677 B2
(45) Date of Patent: Dec. 28, 2021

(54) METHOD FOR ACCESSING WIRELESS NETWORK, AND TERMINAL DEVICE

(71) Applicant: Guangdong Oppo Mobile Telecommunications Corp., Ltd., Guangdong (CN)

(72) Inventor: Yi Yu, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 473 days.

(21) Appl. No.: 16/223,755

(22) Filed: Dec. 18, 2018

(65) Prior Publication Data

US 2019/0132737 A1 May 2, 2019

Related U.S. Application Data

(63) Continuation of application No. PCT/CN2017/099194, filed on Aug. 26, 2017.

(30) Foreign Application Priority Data

Dec. 7, 2016 (CN) .......................... 201611118280.1

(51) Int. Cl.
*H04W 12/08* (2021.01)
*H04W 12/06* (2021.01)
(Continued)

(52) U.S. Cl.
CPC ............. *H04W 12/08* (2013.01); *H04W 4/80* (2018.02); *H04W 12/06* (2013.01); *H04W 48/02* (2013.01);
(Continued)

(58) Field of Classification Search
CPC ....... H04W 12/08; H04W 76/30; H04W 4/80; H04W 12/06; H04W 48/02; H04W 48/16;
(Continued)

(56) References Cited

U.S. PATENT DOCUMENTS 8,116,223 B2 * 2/2012 Tian ...................... H04W 76/15
370/252
9,560,410 B2 * 1/2017 Bruhn .............. H04N 21/43615
(Continued)

FOREIGN PATENT DOCUMENTS

CN 101491144 A 7/2009
CN 101631358 A 1/2010
(Continued)

OTHER PUBLICATIONS

International search report issued in corresponding international application No. PCT/CN2017/099194 dated Nov. 3, 2017.
(Continued)

*Primary Examiner* — Hai V Nguyen
(74) *Attorney, Agent, or Firm* — Young Basile Hanlon & MacFarlane, P.C.

(57) ABSTRACT

Method for accessing a wireless network, and terminal device are provided. The method includes the following. When a wireless fidelity (Wi-Fi) module is detected to be disconnected from a wireless network currently accessed, a reason for disconnection between the Wi-Fi module and the wireless network currently accessed is determined. Description information indicating the reason for disconnection between the Wi-Fi module and the wireless network currently accessed is generated and sent to the Wi-Fi module. The description information is received via the Wi-Fi module, and at least one beacon frame is received and recorded within a first preset time period when the description information is determined to be matched with preset description information via the Wi-Fi module. A disconnected wireless network is accessed according to a target beacon frame of the disconnected wireless network when the at least one beacon frame is detected to include the target beacon frame.

20 Claims, 5 Drawing Sheets

(51) Int. Cl.
*H04W 72/04* (2009.01)
*H04W 84/12* (2009.01)
*H04W 52/02* (2009.01)
*H04W 76/30* (2018.01)
*H04W 48/16* (2009.01)
*H04W 4/80* (2018.01)
*H04W 48/18* (2009.01)
*H04W 48/02* (2009.01)
*H04W 48/08* (2009.01)

(52) U.S. Cl.
CPC .......... *H04W 48/08* (2013.01); *H04W 48/16* (2013.01); *H04W 48/18* (2013.01); *H04W 52/0229* (2013.01); *H04W 52/0261* (2013.01); *H04W 72/0446* (2013.01); *H04W 76/30* (2018.02); *H04W 84/12* (2013.01); *Y02D 30/70* (2020.08)

(58) Field of Classification Search
CPC ............ H04W 48/18; H04W 52/0229; H04W 52/0261; H04W 72/0446; H04W 84/12; Y02D 30/70
USPC .......................................................... 726/4
See application file for complete search history.

(56) References Cited

U.S. PATENT DOCUMENTS

| | | | | |
|---|---|---|---|---|
| 9,730,252 B2* | 8/2017 | Wang | H04W 48/14 |
| 9,814,084 B2* | 11/2017 | Sidhu | H04W 12/50 |
| 9,820,314 B2* | 11/2017 | Sidhu | H04W 8/005 |
| 9,918,351 B2* | 3/2018 | Kim | H04L 67/303 |
| 9,980,192 B2* | 5/2018 | Williams | H04W 36/18 |
| 10,419,280 B2* | 9/2019 | Liu | H04L 41/0803 |
| 10,716,043 B2* | 7/2020 | Shao | H04W 36/0061 |
| 10,820,369 B2* | 10/2020 | Liu | H04W 76/11 |
| 2008/0247377 A1* | 10/2008 | Van Horn | H04W 52/0225 370/348 |
| 2011/0116415 A1* | 5/2011 | Naito | H04W 12/04 370/254 |
| 2011/0268027 A1* | 11/2011 | Nogawa | H04W 48/18 370/328 |
| 2013/0094047 A1* | 4/2013 | Bailey | G06F 21/608 358/1.14 |
| 2013/0303289 A1* | 11/2013 | Zhang | A63F 13/34 463/42 |
| 2014/0073288 A1* | 3/2014 | Velasco | H04W 12/06 455/411 |
| 2014/0287695 A1* | 9/2014 | Nogawa | H04W 48/18 455/68 |
| 2014/0337633 A1* | 11/2014 | Yang | H04L 9/3297 713/178 |
| 2015/0085849 A1* | 3/2015 | Kim | H04W 72/0446 370/338 |
| 2015/0142946 A1* | 5/2015 | Alam | H04W 36/36 709/224 |
| 2015/0245268 A1* | 8/2015 | Williams | H04W 36/14 370/331 |
| 2016/0044032 A1* | 2/2016 | Kim | H04W 76/15 726/5 |
| 2016/0044719 A1* | 2/2016 | Sidhu | H04W 76/11 370/329 |
| 2016/0078758 A1* | 3/2016 | Basalamah | G08G 1/0141 701/118 |
| 2016/0081128 A1* | 3/2016 | Sidhu | H04W 4/00 370/329 |
| 2016/0191991 A1* | 6/2016 | Bruhn | H04N 21/4135 725/80 |
| 2016/0205578 A1* | 7/2016 | Lee | H04W 76/12 455/442 |
| 2016/0270129 A1* | 9/2016 | Wang | H04W 48/20 |
| 2016/0299753 A1* | 10/2016 | Tseng | G06F 8/654 |
| 2016/0360473 A1* | 12/2016 | Kim | H04W 48/16 |
| 2017/0094706 A1* | 3/2017 | Kim | H04W 12/08 |
| 2017/0127472 A1* | 5/2017 | Wang | H04W 76/38 |
| 2017/0134255 A1* | 5/2017 | Amini | H04L 43/16 |
| 2017/0134365 A1* | 5/2017 | Li | H04W 48/16 |
| 2017/0181039 A1* | 6/2017 | Adachi | H04W 28/20 |
| 2017/0208630 A1* | 7/2017 | Liu | H04W 76/14 |
| 2017/0272314 A1* | 9/2017 | Liu | H04W 76/10 |
| 2018/0152955 A1* | 5/2018 | Park | H04W 36/0027 |
| 2018/0249521 A1* | 8/2018 | Kim | H04W 4/60 |
| 2019/0150041 A1* | 5/2019 | Shao | H04W 36/0061 370/331 |

FOREIGN PATENT DOCUMENTS

| | | |
|---|---|---|
| CN | 101662818 A | 3/2010 |
| CN | 103079286 A | 5/2013 |
| CN | 104486825 A | 4/2015 |
| CN | 104968029 A | 10/2015 |
| CN | 104981000 A | 10/2015 |
| CN | 105208630 A | 12/2015 |
| CN | 105307224 A | 2/2016 |
| CN | 105684521 A | 6/2016 |
| CN | 105792317 A | 7/2016 |
| CN | 105916181 A | 8/2016 |
| CN | 105959999 A | 9/2016 |
| CN | 105979516 A | 9/2016 |
| CN | 106162718 A | 11/2016 |
| EP | 1398912 A1 | 3/2004 |
| EP | 2384063 A1 | 11/2011 |
| EP | 2739093 A1 | 6/2014 |
| EP | 2838310 A1 | 2/2015 |
| EP | 3043595 A1 | 7/2016 |
| WO | 2015192453 A1 | 12/2015 |
| WO | 2016088727 A1 | 7/2017 |

OTHER PUBLICATIONS

Extended European search report issued in corresponding European application No. 17878822.0 dated Apr. 18, 2019.
First examination report issued in corresponding IN application No. 201917000246 dated Jul. 29, 2020.
English translation of the first office action issued in corresponding CN application No. 201611118280.1 dated Apr. 1, 2019.
English translation of the second office action issued in corresponding CN application No. 201611118280.1 dated Aug. 1, 2019.
English translation of the third office action issued in corresponding CN application No. 201611118280.1 dated Nov. 4, 2019.
English translation of the Rejection issued in corresponding CN application No. 201611118280.1 dated Feb. 3, 2020.

* cited by examiner

METHOD FOR ACCESSING WIRELESS NETWORK, AND TERMINAL DEVICE

CROSS-REFERENCE TO RELATED APPLICATION(S)

This application is a continuation of International Application No. PCT/CN2017/099194, filed on Aug. 26, 2017, which claims priority to Chinese Patent Application No. 201611118280.1, filed on Dec. 7, 2016, the disclosures of which are hereby incorporated by reference in their entireties.

TECHNICAL FIELD

This disclosure relates to the technical field of terminal devices, and particularly to a method for accessing a wireless network, and a terminal device.

BACKGROUND

With the development of computer technologies, a variety of terminal devices (electronic products such as laptops, tablet computers, smartphones, personal digital assistant (PDA), and the like) are springing up, bringing great convenience to people's work and life. For example, people can use the smartphone to make calls, take photos, listen to music, play games, locate, and the like. With wireless network technologies, different terminals can be connected together wirelessly. As one of the wireless network technologies, wireless fidelity (Wi-Fi) can connect terminals via radio waves, with advantages of high data transmission speed, wire-free, high security, and the like. Within an effective range covered by radio waves of a wireless router, all kinds of Wi-Fi compatible terminals can connect to the wireless router through Wi-Fi connections, so as to implement networking.

SUMMARY

According to a first aspect of implementations of the disclosure, a method for accessing a wireless network is provided. The method includes the following.

When a wireless fidelity (Wi-Fi) module of a terminal device is detected to be disconnected from a wireless network currently accessed, a reason for disconnection between the Wi-Fi module and the wireless network currently accessed is determined. Description information indicating the reason for disconnection between the Wi-Fi module and the wireless network currently accessed is generated and sent to the Wi-Fi module. The description information is received via the Wi-Fi module, and at least one beacon frame is received and recorded within a first preset time period when the description information is determined to be matched with preset description information via the Wi-Fi module. Access a disconnected wireless network according to a target beacon frame of the disconnected wireless network when the at least one beacon frame is detected to include the target beacon frame.

According to a second aspect of implementations of the disclosure, a terminal device is provided. The terminal device includes at least one processor and a computer readable storage. The computer readable storage is coupled to the at least one processor and stores at least one computer executable instruction thereon which, when executed by the at least one processor, causes the at least one processor to carry out the following actions.

When a Wi-Fi module of a terminal device is detected to be disconnected from a wireless network currently accessed, a reason for disconnection between the Wi-Fi module and the wireless network currently accessed is determined. Description information indicating the reason for disconnection between the Wi-Fi module and the wireless network currently accessed is generated and sent to the Wi-Fi module. The description information is received via the Wi-Fi module, and at least one beacon frame is received and recorded within a first preset time period when the description information is determined to be matched with preset description information via the Wi-Fi module. Access a disconnected wireless network according to a target beacon frame of the disconnected wireless network when the at least one beacon frame is detected to include the target beacon frame.

According to a third aspect, a non-transitory computer readable storage medium is provided. The non-transitory computer readable storage medium is configured to store a computer program which, when executed by a processor, causes the processor to carry out the following.

When a Wi-Fi module of a terminal device is detected to be disconnected from a wireless network currently accessed, a reason for disconnection between the Wi-Fi module and the wireless network currently accessed is determined. Description information indicating the reason for disconnection between the Wi-Fi module and the wireless network currently accessed is generated and sent to the Wi-Fi module. The description information is received via the Wi-Fi module, and at least one beacon frame is received and recorded within a first preset time period when the description information is determined to be matched with preset description information via the Wi-Fi module. Access a disconnected wireless network according to a target beacon frame of the disconnected wireless network when the at least one beacon frame is detected to include the target beacon frame.

BRIEF DESCRIPTION OF THE DRAWINGS

To describe technical solutions in implementations of the present disclosure or in the related art more clearly, the following briefly introduces the accompanying drawings required for describing the implementations or the related art. Apparently, the accompanying drawings in the following description illustrate some implementations of the present disclosure. Those of ordinary skill in the art may also obtain other drawings based on these accompanying drawings without creative efforts.

DETAILED DESCRIPTION

Figure 1:
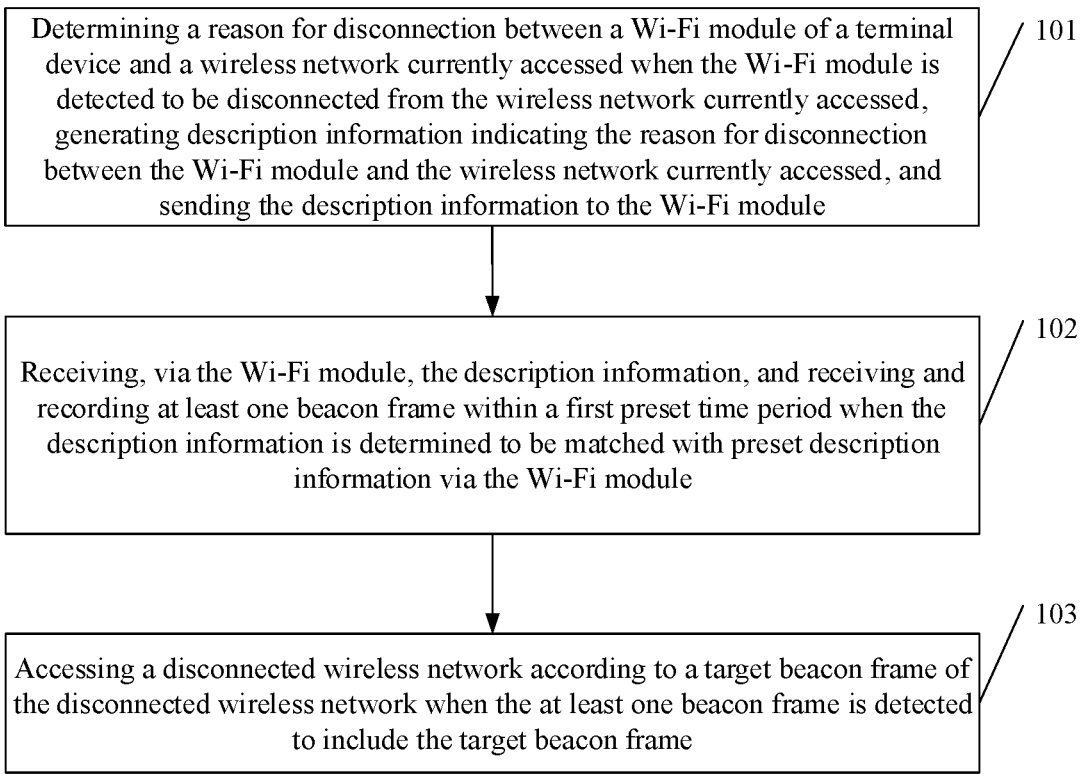
FIG. 1 is a schematic flow chart illustrating a method for accessing a wireless network according to an implementation of the present disclosure.

In order to enable those skilled in the art to better understand solutions of the present disclosure, technical solutions in implementations of the present disclosure will be described clearly and completely hereinafter with reference to the accompanying drawings in the implementations of the present disclosure. Apparently, the described implementations are merely some rather than all implementations of the present disclosure. All other implementations obtained by those of ordinary skill in the art based on the implementations of the present disclosure without creative efforts shall fall within the protection scope of the present disclosure.

The terms "first", "second", and the like used in the specification, the claims, and the accompany drawings of the present disclosure are used to distinguish different objects rather than describe a particular order. The terms "include", "comprise", and "have" as well as variations thereof are intended to cover non-exclusive inclusion. For example, a process, method, system, product, or apparatus including a series of steps or units is not limited to the listed steps or units, on the contrary, it can optionally include other steps or units that are not listed; alternatively, other steps or units inherent to the process, method, product, or device can be included either.

The term or "implementation" referred to herein means that a particular feature, structure, or feature described in conjunction with the implementation may be contained in at least one implementation of the present disclosure. The phrase appearing in various places in the specification does not necessarily refer to the same implementation, nor does it refer to an independent or alternative implementation that is mutually exclusive with other implementations. It is expressly and implicitly understood by those skilled in the art that an implementation described herein may be combined with other implementations.

In related arts, limited by battery capacity, terminal devices such as phones and tablet computers have to be charged once a day even equipped with large capacity batteries. When a phone is in a standby state, and a wireless fidelity (Wi-Fi) module of the phone is turned on but no router is connected, upper layer software of the phone will wake up the system periodically and initiate an active scanning command automatically. After receiving the active scanning command, lower layer software will transmit the active scanning command to the Wi-Fi module. Thereafter, the Wi-Fi module begins to perform active scanning. When the active scanning is completed, a scanning result will be sent to software and displayed through the software. The above-described process will result in increased power consumption and shortened battery life of the terminal device.

According to a method for accessing a wireless network in implementations of the disclosure, when the terminal device detects that a Wi-Fi module of a terminal device is disconnected from a wireless network currently accessed, a reason for disconnection between the Wi-Fi module and the wireless network currently accessed is determined. Description information is generated, and sent to the Wi-Fi module. The description information is received via the Wi-Fi module, and at least one beacon frame is received and recorded within a first preset time period when the description information is determined to be matched with preset description information via the Wi-Fi module. When the at least one beacon frame is detected to include a target beacon frame of a disconnected wireless network, the terminal device accesses the disconnected wireless network according to the target beacon frame. In this way, when the terminal device is disconnected from the wireless network currently accessed, during scanning, the terminal device can access a wireless network according to the target beacon frame received without sending any signal. It is possible to decrease power consumption and prolong battery life of the terminal device.

In order to facilitate understanding of the method for accessing a wireless network and the terminal devices in implementations of the present disclosure, the implementations will be described in detail hereinafter.

FIG. 1 is a schematic flow chart illustrating a method for accessing a wireless network according to an implementation of the present disclosure. As illustrated in FIG. 1, the method for accessing a wireless network includes the following.

At block 101, a reason for disconnection between a Wi-Fi module of a terminal device and a wireless network currently accessed is determined when the Wi-Fi module is detected to be disconnected from the wireless network currently accessed. Description information indicating the reason for disconnection between the Wi-Fi module and the wireless network currently accessed is generated and sent to the Wi-Fi module.

In one implementation, before the reason for disconnection between the Wi-Fi module of the terminal device and the wireless network currently accessed is determined when the Wi-Fi module is detected to be disconnected from the wireless network currently accessed, the method further includes the following.

Wireless access point information corresponding to a wireless network is acquired when the Wi-Fi module of the terminal device is detected to access the wireless network, and the wireless access point information is added to a pre-stored wireless access point information set, where the wireless access point information includes a beacon frame corresponding to a wireless access point.

In one implementation, when the Wi-Fi module of the terminal device is detected to access the wireless network, the wireless access point information corresponding to the wireless network is acquired. A command is sent to the Wi-Fi module to instruct the Wi-Fi module to acquire and record the wireless access point information corresponding to the wireless network, and add the wireless access point information corresponding to the wireless network to the pre-stored wireless access point information set.

At block 102, the description information is received via the Wi-Fi module, and at least one beacon frame is received and recorded within a first preset time period when the description information is determined to be matched with preset description information via the Wi-Fi module.

In one implementation, the preset description information may indicate a disconnection caused by a beacon timeout or a disconnection caused by user operation. When the description information indicates a disconnection caused by user operation, the description information is not matched with the preset description information. In this case, the operation that the at least one beacon frame is received and recorded within the first preset time period will not be performed. Otherwise, the above operation will be performed.

In one implementation, the at least one beacon frame is received and recorded within the first preset time period as follows. Switch to a current channel when an identity (ID) of the current channel is unprocessed. The at least one beacon frame on the current channel is received within the first preset time period via the Wi-Fi module. The at least one beacon frame received is recorded into a preset beacon frame set. The ID of the current channel is updated to be unprocessed according to a channel list when the first preset time period has elapsed.

For example, the terminal device continuously switches among channels listed in the channel list and waits for arrivals of beacon frames. All beacon frames received are stored temporarily to extract related data of a basic service set (BSS) sending these beacon frames. During scanning, a work station (i.e. the terminal device) will continuously switch among the channels and record information of any beacon frame received. The beacon frame is designed to notify the work station parameters required to connect to a certain BSS, so as to facilitate communication.

At block 103, access a disconnected wireless network according to a target beacon frame of the disconnected wireless network when the at least one beacon frame is detected to include the target beacon frame.

In one implementation, the disconnected wireless network may be a wireless network corresponding to any wireless access point information in the pre-stored wireless access point information set. It should be noted that, the wireless network currently accessed at block 101, (that is, a most recent disconnected wireless network) can also be included in the pre-stored wireless access point information set. That is to say, when the at least one beacon frame is detected to include the target beacon frame, the most recent disconnected wireless network can be accessed or a wireless network corresponding to any wireless access point information in the pre-stored wireless access point information set other than the most recent disconnected wireless network can be accessed.

In one implementation, the disconnected wireless network is accessed according to the target beacon frame as follows. Second access authentication information enrolled is acquired. The second access authentication information is sent to a wireless access point corresponding to the target beacon frame. The second access authentication information is configured to connect the terminal device to a corresponding wireless network after the wireless access point corresponding to the target beacon frame authenticates the terminal device.

In one implementation, the second access authentication information enrolled is acquired as follows. When the at least one beacon frame is detected to include the target beacon frame, an authentication information enrolling interface and a wireless access point identifier corresponding to the target beacon frame are displayed, and the second access authentication information enrolled by a user on the authentication information enrolling interface is acquired. Alternatively, the second access authentication information enrolled is acquired as follows. When the at least one beacon frame is detected to include the target beacon frame, pre-stored second access authentication information is acquired.

In one implementation, the method further includes the following.

When the at least one beacon frame is detected to include no target beacon frame of the disconnected wireless network, a probe request frame is sent within a second preset time period. Whether a probe response frame generated by a wireless access point in response to the probe request frame is received is detected. When the probe response frame generated by the wireless access point in response to the probe request frame is detected to be received, first access authentication information is sent to the wireless access point generating the probe response frame. The first access authentication information is configured to connect the terminal device to a wireless network corresponding to the wireless access point generating the probe response frame after the wireless access point generating the probe response frame authenticates the terminal device.

According to the method for accessing a wireless network in the implementation of the disclosure, when the terminal device detects that the Wi-Fi module of the terminal device is disconnected from the wireless network currently accessed, the reason for disconnection between the Wi-Fi module and the wireless network currently accessed is determined. The description information is generated, and sent to the Wi-Fi module. The description information is received via the Wi-Fi module, and the at least one beacon frame is received and recorded within the first preset time period when the description information is determined to be matched with the preset description information via the Wi-Fi module. When the at least one beacon frame is detected to include the target beacon frame of the disconnected wireless network, the terminal device accesses the disconnected wireless network according to the target beacon frame. In this way, when the terminal device is disconnected from the wireless network currently accessed, during scanning, the terminal device can access a wireless network according to the target beacon frame received without sending any signal. It is possible to decrease power consumption and prolong battery life of the terminal device.

Figure 2:
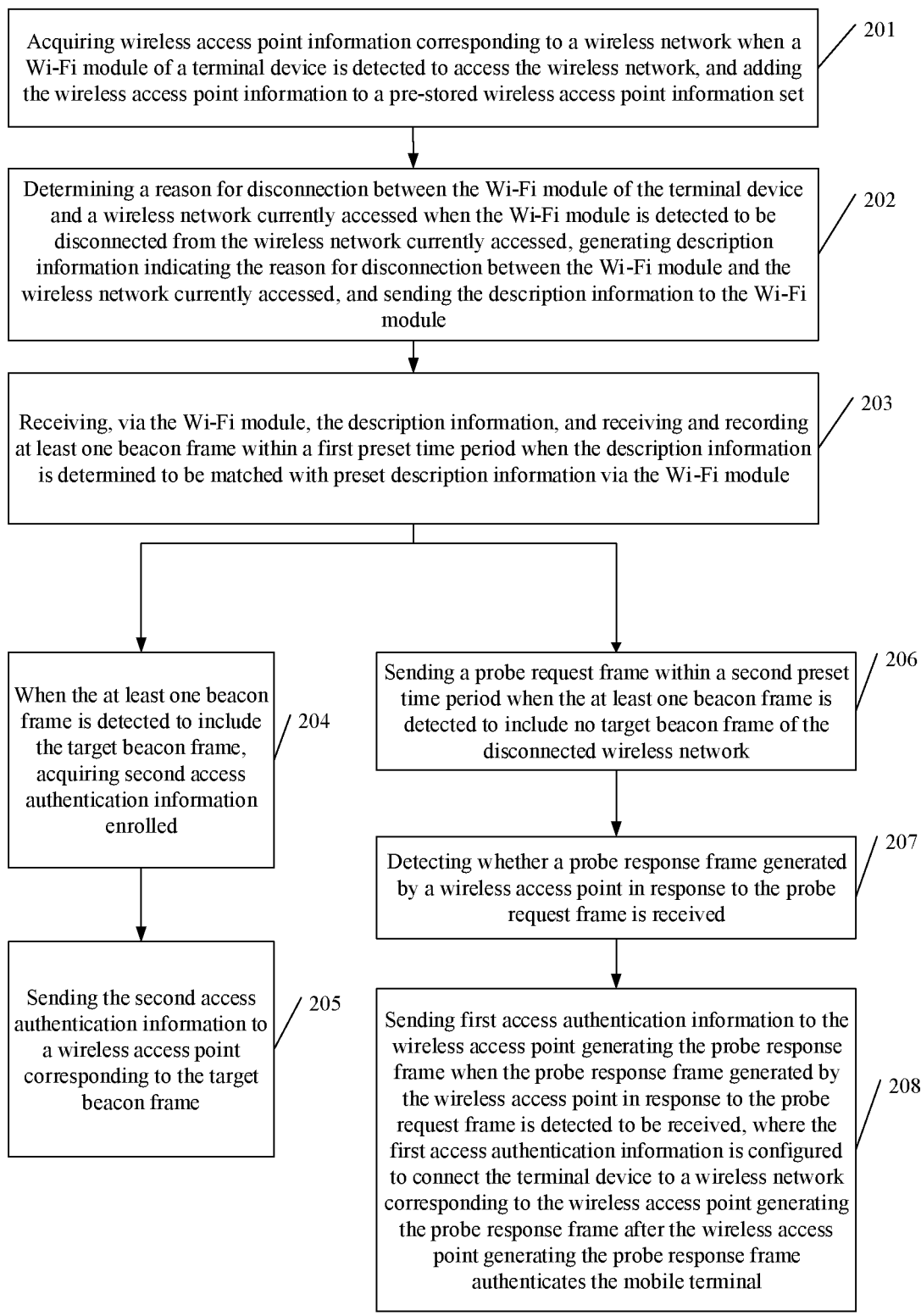
FIG. 2 is a schematic flow chart illustrating another method for accessing a wireless network according to an implementation of the present disclosure.

Consistent with FIG. 1, FIG. 2 is a schematic flow chart illustrating another method for accessing a wireless network according to an implementation of the present disclosure. As illustrated in FIG. 2, the method for accessing a wireless network includes the following.

At block 201, when a Wi-Fi module of a terminal device is detected to access a wireless network, wireless access point information corresponding to the wireless network is acquired, and the wireless access point information is added to a pre-stored wireless access point information set. The wireless access point information includes a beacon frame corresponding to a wireless access point.

At block 202, when the Wi-Fi module of the terminal device is detected to be disconnected from a wireless network currently accessed, a reason for disconnection between the Wi-Fi module and the wireless network currently accessed is determined. Description information indicating the reason for disconnection between the Wi-Fi module and the wireless network currently accessed is generated, and sent to the Wi-Fi module.

At block 203, the description information is received via the Wi-Fi module, and at least one beacon frame is received and recorded within a first preset time period when the description information is determined to be matched with preset description information via the Wi-Fi module.

When the at least one beacon frame is detected to include the target beacon frame, the method proceeds to operations at block 204 to block 205; when the at least one beacon frame is detected to include no target beacon frame, the method advances to operations at block 206 to block 208.

At block 204, when the at least one beacon frame is detected to include the target beacon frame, second access authentication information enrolled is acquired.

At block 205, the second access authentication information is sent to a wireless access point corresponding to the target beacon frame. The second access authentication information is configured to connect the terminal device to a corresponding wireless network after the wireless access point corresponding to the target beacon frame authenticates the terminal device.

At block 206, when the at least one beacon frame is detected to include no target beacon frame, a probe request frame is sent within a second preset time period.

At block 207, whether a probe response frame generated by a wireless access point in response to the probe request frame is received is detected.

At block 208, when the probe response frame generated by the wireless access point in response to the probe request frame is detected to be received, first access authentication information is sent to the wireless access point generating the probe response frame. The first access authentication information is configured to connect the terminal device to a wireless network corresponding to the wireless access point generating the probe response frame after the wireless access point generating the probe response frame authenticates the terminal device.

As one implementation, operations at block 206 to block 208 relates to active scanning. That is, the mobile phone (i.e. work station) actively sends a probe request frame(s) on each channel to request response of a specific wireless network. The "active scanning" means to search for a wireless network actively rather than waiting for a signal from the wireless network. The work station adopting the active scanning will scan channels listed in the channel list as follows. (1) Switch to a channel and wait for an indication of an incoming frame or wait until a ProbeDelay timer times out. If a frame is received on the channel, it means that the channel is occupied and can be further probed. Because of the ProbeDelay timer, the work station would not wait for the arrival of the frame all the time, which can prevent an idle channel from stopping the whole process (that is, the process of the active scanning). (2) Obtain a right to use a medium by using a basic distributed coordination function (DCF) access mechanism, and then send a probe request frame. (3) Wait at least for a minimum channel time (represented as "MinChannelTime"). a. If the medium is not busy, it indicates that there is no network, and in this situation the work station can switch to a next channel. b. If the medium is busy within the MinChannelTime, continue to wait until a maximum channel time (represented as "MaxChannelTime") times out, and process any probe response frame received. Sometimes it may cost a long time for the mobile phone to search for a Wi-Fi hotspot, because multiple APs existing in the area around the mobile phone may respond probe response frames through a congestion window after the mobile phone sends the probe request frame, and the congestion process is limited by the MaxChannelTime. When receiving the probe request frame searching for an extended service set (ESS) to which the wireless network belongs, the wireless network will send a probe response frame. In order to find out all wireless networks nearby, the probe request frame may carry a broadcast service set identifier (SSID). In this way, all 802.11-based wireless networks in the area may respond with probe response frames.

In one implementation, the at least one beacon frame is received and recorded within the first preset time period as follows.

Switch to a current channel when an ID of the current channel is unprocessed. The at least one beacon frame on the current channel is received within the first preset time period via the Wi-Fi module. The at least one beacon frame received is recorded into a preset beacon frame set. The ID of the current channel is updated to be unprocessed according to a channel list when the first preset time period has elapsed.

According to the method for accessing a wireless network in the implementation of the disclosure, when the terminal device detects that the Wi-Fi module of the terminal device is disconnected from the wireless network currently accessed, the reason for disconnection between the Wi-Fi module and the wireless network currently accessed is determined. The description information is generated, and sent to the Wi-Fi module. The description information is received via the Wi-Fi module, and the at least one beacon frame is received and recorded within the first preset time period when the description information is determined to be matched with the preset description information via the Wi-Fi module. When the at least one beacon frame is detected to include the target beacon frame of the disconnected wireless network, the terminal device accesses the disconnected wireless network according to the target beacon frame. In this way, when the terminal device is disconnected from the wireless network currently accessed, in the process of scanning, the terminal device can access a wireless network according to the target beacon frame received without sending any signal, which can decrease power consumption and prolong battery life of the terminal device.

Figure 3:
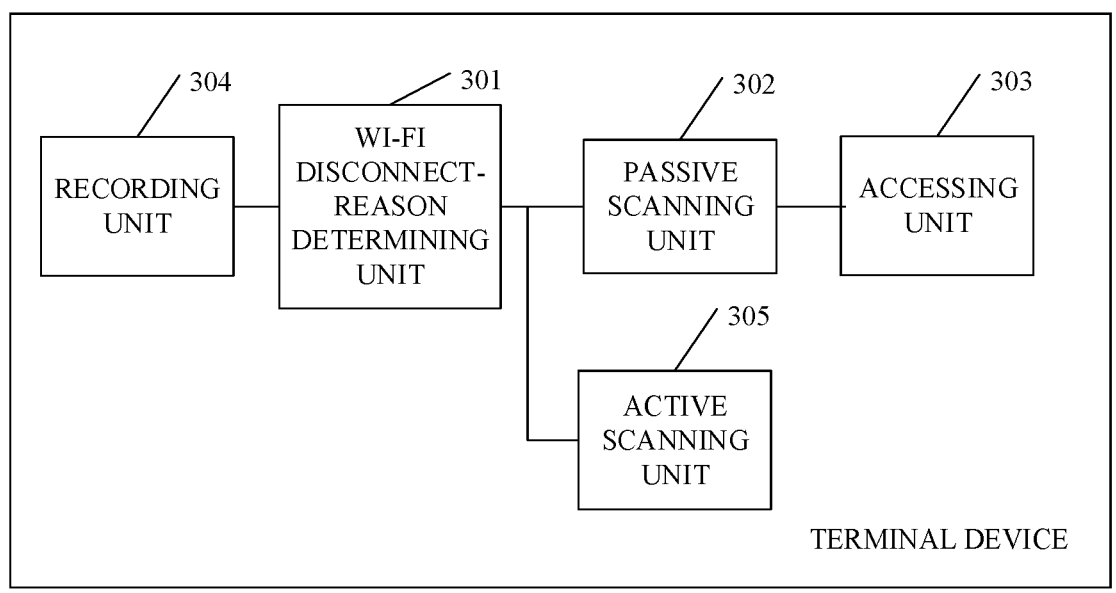
FIG. 3 is a block diagram of a terminal device according to an implementation of the present disclosure.

The following describes device implementations. The device illustrated in device implementations is configured to implement the methods in the method implementations of the disclosure. As illustrated in FIG. 3, a terminal device is provided. The terminal device includes a Wi-Fi disconnect-reason determining unit 301, a passive scanning unit 302, and an accessing unit 303.

The Wi-Fi disconnect-reason determining unit 301 is configured to determine a reason for disconnection between a Wi-Fi module of a terminal device and a wireless network currently accessed when the Wi-Fi module is detected to be disconnected from the wireless network currently accessed, to generate description information indicating the reason for disconnection between the Wi-Fi module and the wireless network currently accessed, and to send the description information to the Wi-Fi module.

The passive scanning unit 302 is configured to receive, via the Wi-Fi module, the description information, and to receive and record at least one beacon frame within a first preset time period when the description information is determined to be matched with preset description information via the Wi-Fi module.

The accessing unit 303 is configured to access a disconnected wireless network according to a target beacon frame of the disconnected wireless network when the at least one beacon frame is detected to include the target beacon frame.

In one implementation, the terminal device further includes a recording unit 304.

The recoding unit 304 is configured to acquire wireless access point information corresponding to a wireless network when the Wi-Fi module of the terminal device is detected to access the wireless network, and to add the wireless access point information to a pre-stored wireless access point information set, before the Wi-Fi disconnect-reason determining unit determines the reason for disconnection between the Wi-Fi module of the terminal device and the wireless network currently accessed when the Wi-Fi module is detected to be disconnected from the wireless network currently accessed. The wireless access point information includes a beacon frame corresponding to a wireless access point.

In one implementation, the terminal device further includes an active scanning unit 305.

The active scanning unit 305 is configured to send a probe request frame within a second preset time period when the at least one beacon frame is detected not to include the target beacon frame of the disconnected wireless network, to detect whether a probe response frame generated by a wireless access point in response to the probe request frame is received, and to send first access authentication information to the wireless access point generating the probe response frame when the probe response frame generated by the wireless access point in response to the probe request frame is detected to be received. The first access authentication information is configured to connect the terminal device to a wireless network corresponding to the wireless access point generating the probe response frame after the wireless access point generating the probe response frame authenticates the terminal device.

In one implementation, the accessing unit 303 configured to access the disconnected wireless network according to the target beacon frame is configured to acquire second access authentication information enrolled, and to send the second access authentication information to a wireless access point corresponding to the target beacon frame. The second access authentication information is configured to connect the terminal device to a corresponding wireless network after the wireless access point corresponding to the target beacon frame authenticates the terminal device.

In one implementation, the accessing unit 303 configured to acquire the second access authentication information enrolled is configured to display an authentication information enrolling interface and a wireless access point identifier corresponding to the target beacon frame, and to acquire the second access authentication information enrolled by a user on the authentication information enrolling interface, when the at least one beacon frame is detected to include the target beacon frame.

In one implementation, the accessing unit 303 configured to acquire the second access authentication information enrolled is configured to acquire pre-stored second access authentication information when the at least one beacon frame is detected to include the target beacon frame.

In one implementation, the passive scanning unit 302 configured to receive and record the at least one beacon frame within the first preset time period is configured to switch to a current channel when an ID of the current channel is unprocessed, to receive, within the first preset time period, the at least one beacon frame on the current channel via the Wi-Fi module, to record the at least one beacon frame received into a preset beacon frame set, and to update the ID of the current channel to be unprocessed according to a channel list when the first preset time period has elapsed.

It is to be noted that, the terminal device described in the device implementation of the disclosure is presented in the form of functional units. The term "unit" used herein should be understood as the broadest meaning as possible, and an object for implementing functions defined by each "unit" may be, for example, an integrated circuit (ASIC), a single circuit, a processor (shared, dedicated, or chipset) and a memory for executing one or more software or firmware programs, a combinational logic circuit, and/or other suitable components that can achieve the above described functions.

Figure 4:
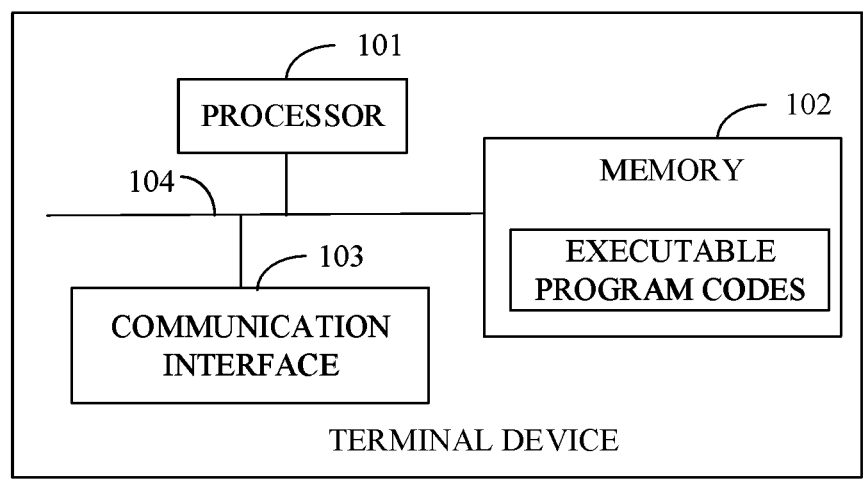
FIG. 4 is a schematic structural diagram illustrating another terminal device according to an implementation of the present disclosure.

For example, the function of the Wi-Fi disconnect-reason determining unit 301 configured to determine the reason for disconnection between the Wi-Fi module of the terminal device and the wireless network currently accessed when the Wi-Fi module is detected to be disconnected from the wireless network currently accessed, to generate the description information, and to send the description information to the Wi-Fi module can be implemented by a terminal device illustrated in FIG. 4. The terminal device may invoke executable program codes stored in a memory 102 through a processor 101 to determine the reason for disconnection between the Wi-Fi module of the terminal device and the wireless network currently accessed when the Wi-Fi module is detected to be disconnected from the wireless network currently accessed, to generate the description information, and to send the description information to the Wi-Fi module.

According to the method for accessing a wireless network in the implementation of the disclosure, when the terminal device detects that the Wi-Fi module of the terminal device is disconnected from the wireless network currently accessed, the reason for disconnection between the Wi-Fi module and the wireless network currently accessed is determined. The description information is generated, and sent to the Wi-Fi module. The description information is received via the Wi-Fi module, and the at least one beacon frame is received and recorded within the first preset time period when the description information is determined to be matched with the preset description information via the Wi-Fi module. When the at least one beacon frame is detected to include the target beacon frame of the disconnected wireless network, the terminal device accesses the disconnected wireless network according to the target beacon frame. In this way, when the terminal device is disconnected from the wireless network currently accessed, in the process of scanning, the terminal device can access a wireless network according to the target beacon frame received without sending any signal, which can decrease power consumption and prolongs battery life of the terminal device.

According to another implementation of the disclosure, another terminal device is provided. The terminal device includes at least one processor and a computer readable storage coupled to the at least one processor and stores at least one computer executable instruction thereon. FIG. 4 is a schematic structural diagram illustrating another terminal device according to an implementation of the present disclosure, in the form of a terminal device including a processor, a memory, a communication interface, and a communication bus. As illustrated in FIG. 4, the terminal device includes a processor 101, a memory 102, a communication interface 103, and a communication bus 104. The processor 101, the memory 102, and the communication interface 103 are coupled through the communication bus 104 and communicate with each other. The processor 101 is configured to control wireless communication with an external cellular network. The communication interface 103 includes, but is not limited to, an antenna, an amplifier, a transceiver, a coupler, a low noise amplifier (LNA), and a duplexer. The memory 102 includes at least one of a random access memory (RAM), a non-volatile memory, and an external memory. The memory 102 is configured to store executable program codes which, when executed by the processor 101, are configured to implement the method for accessing a wireless network provided by implementations of the disclosure.

The processor 101 is configured to determine a reason for disconnection between a Wi-Fi module of a terminal device and a wireless network currently accessed when the Wi-Fi module is detected to be disconnected from the wireless network currently accessed, to generate description information indicating the reason for disconnection between the Wi-Fi module and the wireless network currently accessed, and to send the description information to the Wi-Fi module. The processor 101 is configured to receive, via the Wi-Fi module, the description information, and to receive and record at least one beacon frame within a first preset time period when the description information is determined to be matched with preset description information via the Wi-Fi module. The processor 101 is configured to access a disconnected wireless network according to a target beacon frame of the disconnected wireless network when the at least one beacon frame is detected to include the target beacon frame.

In one implementation, the processor 101 is further configured to acquire wireless access point information corresponding to a wireless network when the Wi-Fi module of the terminal device is detected to access the wireless network, and to add the wireless access point information to a pre-stored wireless access point information set, before determining the reason for disconnection between the Wi-Fi module of the terminal device and the wireless network currently accessed when the Wi-Fi module is detected to be disconnected from the wireless network currently accessed. The wireless access point information includes a beacon frame corresponding to a wireless access point.

In one implementation, the disconnected wireless network includes a wireless network corresponding to any wireless access point information in the pre-stored wireless access point information set.

In one implementation, the processor 101 is further configured to send a probe request frame within a second preset time period when the at least one beacon frame is detected not to include the target beacon frame of the disconnected wireless network, to detect whether a probe response frame generated by a wireless access point in response to the probe request frame is received, and to send first access authentication information to the wireless access point generating the probe response frame when the probe response frame generated by the wireless access point in response to the probe request frame is detected to be received. The first access authentication information is configured to connect the terminal device to a wireless network corresponding to the wireless access point generating the probe response frame after the wireless access point generating the probe response frame authenticates the terminal device.

In one implementation, the processor 101 configured to receive and record the at least one beacon frame within the first preset time period is configured to: switch to a current channel when an identity (ID) of the current channel is unprocessed, receive, within the first preset time period, the at least one beacon frame on the current channel via the Wi-Fi module, record the at least one beacon frame received into a preset beacon frame set, and update the ID of the current channel to be unprocessed according to a channel list when the first preset time period has elapsed.

In one implementation, the processor 101 configured to access the disconnected wireless network according to the target beacon frame is configured to acquire second access authentication information enrolled, and to send the second access authentication information to a wireless access point corresponding to the target beacon frame. The second access authentication information is configured to connect the terminal device to a corresponding wireless network after the wireless access point corresponding to the target beacon frame authenticates the terminal device.

In one implementation, the processor 101 configured to acquire the second access authentication information enrolled is configured to: display an authentication information enrolling interface and a wireless access point identifier corresponding to the target beacon frame, and acquire the second access authentication information enrolled by a user on the authentication information enrolling interface, when the at least one beacon frame is detected to include the target beacon frame.

In one implementation, the processor 101 configured to acquire the second access authentication information enrolled is configured to acquire pre-stored second access authentication information when the at least one beacon frame is detected to include the target beacon frame.

According to the method for accessing a wireless network in the implementation of the disclosure, when the terminal device detects that the Wi-Fi module of the terminal device is disconnected from the wireless network currently accessed, the reason for disconnection between the Wi-Fi module and the wireless network currently accessed is determined. The description information is generated, and sent to the Wi-Fi module. The description information is received via the Wi-Fi module, and the at least one beacon frame is received and recorded within the first preset time period when the description information is determined to be matched with the preset description information via the Wi-Fi module. When the at least one beacon frame is detected to include the target beacon frame of the disconnected wireless network, the terminal device accesses the disconnected wireless network according to the target beacon frame. In this way, when the terminal device is disconnected from the wireless network currently accessed, in the process of scanning, the terminal device can access a wireless network according to the target beacon frame received without sending any signal. As a result, power consumption of the terminal device can be decreased and battery life of the terminal device can be prolonged.

Figure 5:
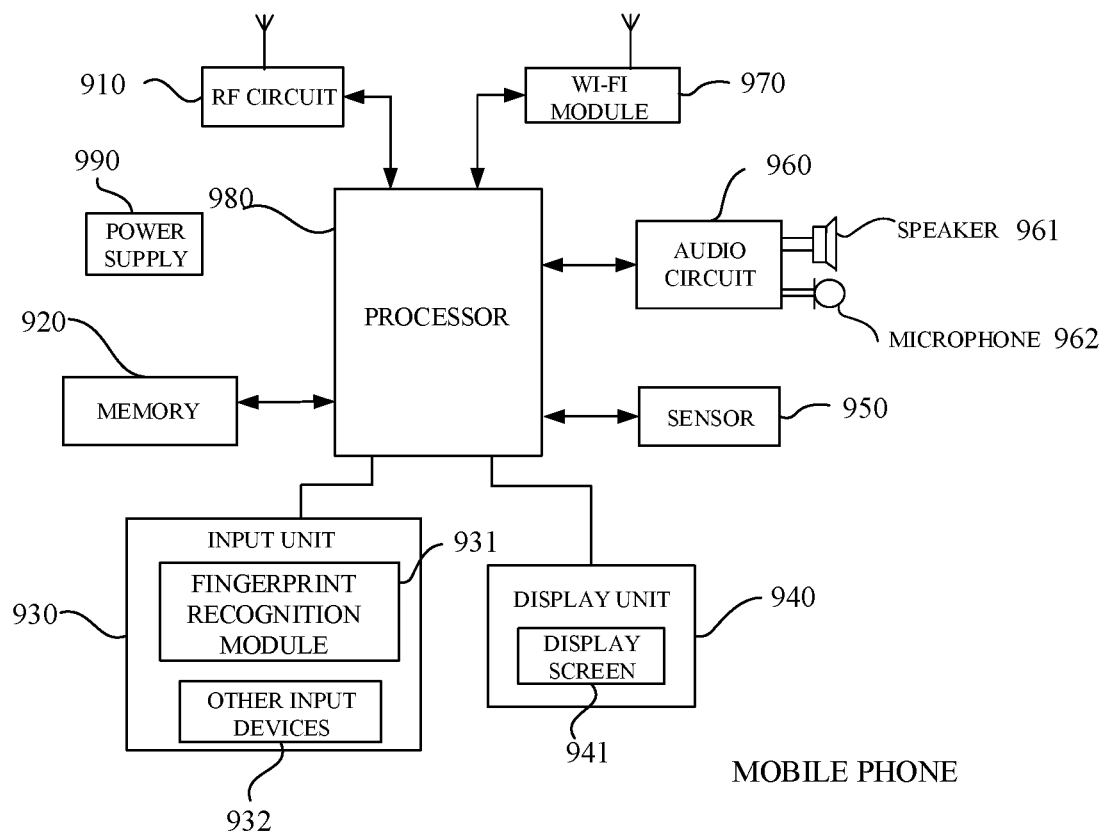
FIG. 5 is a schematic structural diagram illustrating yet another terminal device according to an implementation of the present disclosure.

An implementation of the disclosure further provides yet another terminal device. As illustrated in FIG. 5, only parts related to the implementations of the present disclosure are illustrated for ease of description. For technical details not described, reference may be made to the method implementations of the present disclosure. The terminal device may be any terminal device, such as a mobile phone, a tablet computer, a personal digital assistant (PDA), a point of sale terminal (POS), an on-board computer, and the like. The following describes the mobile phone as an example of the terminal device.

FIG. 5 is a block diagram of a part of a structure of a mobile phone related to a terminal device according to an implementation of the present disclosure. As illustrated in FIG. 5, the mobile phone includes a radio frequency (RF) circuit 910, a memory 920, an input unit 930, a display unit 940, a sensor 950, an audio circuit 960, a Wi-Fi module 970, a processor 980, a power supply 990, and other components. Those skilled in the art can understand that the structure of the mobile phone illustrated in FIG. 5 does not constitute any limitation on a mobile phone. The mobile phone configured to implement technical solutions of the disclosure may include more or fewer components than illustrated, combine certain components, or have different component configuration.

In the following, various components of the mobile phone will be described in detail with reference to FIG. 5.

The RF circuit 910 is configured to transmit or receive information. Generally, the RF circuit 910 includes but is not limited to an antenna, at least one amplifier, a transceiver, a coupler, an LNA, a duplexer, and the like. In addition, the RF circuit 910 may also communicate with the network and other devices via wireless communication. The above wireless communication may use any communication standard or protocol, which includes but is not limited to global system of mobile communication (GSM), general packet radio service (GPRS), code division multiple access (CDMA), wideband code division multiple access (WCDMA), long term evolution (LTE), E-mail, short messaging service (SMS), and so on.

The memory 920 is configured to store software programs and modules, and the processor 980 is configured to execute various function applications and data processing of the mobile phone by running the software programs and the modules stored in the memory 920. The memory 920 mainly includes a program storage area and a data storage area. The program storage area may store an operating system, application programs required for at least one function, and so on. The data storage area may store data (such usage parameters of an application) created according to use of the mobile phone, and so on. In addition, the memory 920 may include a high-speed RAM, and may further include a non-volatile memory such as at least one disk storage device, a flash device, or other non-volatile solid storage devices.

The input unit 930 may be configured to receive input digital or character information and generate key signal input associated with user setting and function control of the mobile phone. As one implementation, the input unit 930 may include a fingerprint recognition module 931 and other input devices 932. The fingerprint recognition module 931 can collect fingerprint data of the user. In one implementation, the fingerprint recognition module 931 may include optical fingerprint module, a capacitive fingerprint module, and a radio frequency fingerprint module. For example, the fingerprint recognition module 931 can be embodied as the capacitive fingerprint module, which includes sensing electrodes (abnormal sensing electrodes and normal sensing electrodes) and signal processing circuits coupled with the sensing electrodes (such as an amplifier circuit, a noise suppression circuit, an analog-to-digital conversion circuit, and the like). In addition to the fingerprint recognition module 931, the input unit 930 may further include other input devices 932. As one implementation, the other input devices 932 may include, but not limit to, one or more of a touch screen, a physical key, a function key (such as a volume control key, a switch key, etc.), a trackball, a mouse, a joystick, and the like.

The display unit 940 is configured to display information input by the user, information provided for the user, or various menus of the mobile phone. The display unit 940 may include a display screen 941, and alternatively, the display screen 941 may be in the form of a liquid crystal display (LCD), an organic light-emitting diode (OLED), and so on. Although the fingerprint recognition module 931 and the display screen 941 are illustrated as two separate components in FIG. 5 to realize the input and output functions of the mobile phone, in some implementations, the fingerprint recognition module 931 may be integrated with the display screen 941 to implement the input and output functions of the mobile phone.

The mobile phone may also include at least one sensor 950, such as a light sensor, a motion sensor, and other sensors. As one implementation, the light sensor may include an ambient light sensor and a proximity sensor, among which the ambient light sensor may adjust the brightness of the display screen 941 according to ambient lights, and the proximity sensor may turn off the display screen 941 and/or backlight when the mobile phone reaches nearby the ear. As a kind of motion sensor, the accelerometer sensor can detect the magnitude of acceleration in all directions (typically three axes) and when the mobile phone is stationary, the accelerometer sensor can detect the magnitude and direction of gravity; the accelerometer sensor can also be configured for applications related to identification of mobile-phone gestures (such as vertical and horizontal screen switch), or can be used for vibration-recognition related functions (such as a pedometer, percussion), and so on. In addition, the mobile phone can also be equipped with a gyroscope, a barometer, a hygrometer, a thermometer, an infrared sensor, and other sensors, and it will not be repeated herein.

The audio circuit 960, a speaker 961, and a microphone 962 may provide an audio interface between the user and the mobile phone. The audio circuit 960 may convert the received audio data to electrical signals and transmit the electrical signals to the speaker 961; thereafter the speaker 961 may convert the electrical signals to sound signals to output. On the other hand, the microphone 962 may convert the received sound signals to electrical signals, which will be received and converted to audio data by the audio circuit 960 to output to the processor 980. The audio data is then processed by the processor 980 and transmitted via the RF circuit 910 to another mobile phone. Alternatively, the audio data may be output to the memory 920 for further processing.

Wi-Fi belongs to a short-range wireless transmission technology. With aid of the Wi-Fi module 970, the mobile phone may assist the user in E-mail receiving and sending, webpage browsing, access to streaming media, and the like. Wi-Fi provides users with wireless broadband Internet access. Although the Wi-Fi module 970 is illustrated in FIG. 5, the Wi-Fi module 970 is not essential to the mobile phone and can be omitted according to actual needs without departing from the essential nature of the present disclosure.

The processor 980 is a control center of the mobile phone and is configured to connect various parts of the whole mobile phone through various interfaces and lines, run or execute software programs and/or modules stored in the memory 920, and invoke data stored in the memory 920 to perform various functions of the mobile phone and process data, thereby monitoring the mobile phone as a whole. In one implementation, the processor 980 may include one or more processing units. For example, the processor 980 may integrate an application processor and a modem processor, where the application processor is configured to handle the operating system, the user interface, the application, and so on, and the modem processor is mainly configured to process wireless communication. It will be understood that the above-mentioned modem processor may not be integrated into the processor 980.

The mobile phone also includes a power supply 990 (e.g., a battery) that supplies power to various components. For instance, the power supply 990 may be logically connected to the processor 980 via a power management system to enable management of charging, discharging, and power consumption through the power management system.

Although not illustrated, the mobile phone may include a camera, a Bluetooth module, etc., and the disclosure will not elaborate herein.

The method of the foregoing implementations illustrated in FIG. 1 and FIG. 2 can be realized based on the structure of the mobile phone.

The functions of the units illustrated in FIG. 3 can be achieved based on the structure of the mobile phone.

Implementations of the present disclosure also provide a non-transitory computer readable storage medium. The non-transitory computer readable storage medium is configured to store programs which, when executed, are operable with a computer to execute all or part of the operations of any of the methods described in the above-described method implementations.

It is to be noted that, for the sake of simplicity, the foregoing method implementations are described as a series of action combinations. However, it will be appreciated by those skilled in the art that the present disclosure is not limited by the sequence of actions described. According to the present disclosure, certain steps or operations may be performed in other order or simultaneously. Besides, it will be appreciated by those skilled in the art that the implementations described in the specification are exemplary implementations and the actions and modules involved are not necessarily essential to the present disclosure.

In the foregoing implementations, the description of each implementation has its own emphasis. For the parts not described in detail in one implementation, reference may be made to related descriptions in other implementations.

In the implementations of the disclosure, the apparatus disclosed in implementations provided herein may be implemented in other manners. For example, the device/apparatus implementations described above are merely illustrative. For instance, the division of the unit is only a logical function division and there can be other manners of division during actual implementations. For example, multiple units or components may be combined or may be integrated into another system, or some features may be ignored, omitted, or not performed. In addition, coupling or communication connection between each illustrated or discussed component may be direct coupling or communication connection, or may be indirect coupling or communication among devices or units via some interfaces, and may be electrical connection, mechanical connection, or other forms of connection.

The units described as separate components may or may not be physically separated. The components illustrated as units may or may not be physical units, that is, they may be in the same place or may be distributed to multiple network elements. All or part of the units may be selected according to actual needs to achieve the purpose of the technical solutions of the implementations.

In addition, the functional units in various implementations of the present disclosure may be integrated into one processing unit, or each unit may be physically present, or two or more units may be integrated into one unit. The above-mentioned integrated unit can be implemented in the form of hardware or a software function unit.

The integrated unit may be stored in a computer-readable memory when it is implemented in the form of a software functional unit and is sold or used as a separate product. Based on such understanding, the technical solutions of the present disclosure essentially, or the part of the technical solutions that contributes to the related art, or all or part of the technical solutions, may be embodied in the form of a software product which is stored in a memory and includes instructions for causing a computer device (which may be a personal computer, a server, or a network device, and so on) to perform all or part of the steps described in the various implementations of the present disclosure. The memory includes various medium capable of storing program codes, such as a USB (universal serial bus) flash disk, a read-only memory (ROM), a RAM, a removable hard disk, Disk, compact disc (CD), or the like.

It will be understood by those of ordinary skill in the art that all or a part of the various methods of the implementations described above may be accomplished by means of a program to instruct associated hardware, the program may be stored in a computer-readable memory, which may include a flash memory, a ROM, a RAM, magnetic disk, compact disc (CD), and so on.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for accessing a wireless network, comprising:
    determining a reason for disconnection between a wireless fidelity (Wi-Fi) module of a terminal device and a wireless network currently accessed when the Wi-Fi module is detected to be disconnected from the wireless network currently accessed, generating description information indicating the reason for disconnection between the Wi-Fi module and the wireless network currently accessed, and sending the description information to the Wi-Fi module;
    receiving, via the Wi-Fi module, the description information, and receiving and recording at least one beacon frame within a first preset time period when the description information is determined to be matched with preset description information via the Wi-Fi module; and
    accessing a disconnected wireless network according to a target beacon frame of the disconnected wireless network when the at least one beacon frame is detected to comprise the target beacon frame.

2. The method of claim 1, further comprising:
    prior to determining the reason for disconnection between the Wi-Fi module of the terminal device and the wireless network currently accessed when the Wi-Fi module is detected to be disconnected from the wireless network currently accessed:
    acquiring wireless access point information corresponding to a wireless network when the Wi-Fi module of the terminal device is detected to access the wireless network, and adding the wireless access point information to a pre-stored wireless access point information set, wherein the wireless access point information comprises a beacon frame corresponding to a wireless access point.

3. The method of claim 2, wherein the disconnected wireless network comprises a wireless network corresponding to any wireless access point information in the pre-stored wireless access point information set.

4. The method of claim 1, further comprising:
    sending a probe request frame within a second preset time period when the at least one beacon frame is detected to comprise no target beacon frame of the disconnected wireless network;
    detecting whether a probe response frame generated by a wireless access point in response to the probe request frame is received; and
    sending first access authentication information to the wireless access point generating the probe response frame when the probe response frame generated by the wireless access point in response to the probe request frame is detected to be received, wherein the first access authentication information is configured to connect the terminal device to a wireless network corresponding to the wireless access point generating the probe response frame after the wireless access point generating the probe response frame authenticates the terminal device.

5. The method of claim 1, wherein receiving and recording the at least one beacon frame within the first preset time period comprises:
- switching to a current channel when an identity (ID) of the current channel is unprocessed;
- receiving, within the first preset time period, the at least one beacon frame on the current channel via the Wi-Fi module;
- recording the at least one beacon frame received into a preset beacon frame set; and
- updating the ID of the current channel to be unprocessed according to a channel list when the first preset time period has elapsed.

6. The method of claim 1, wherein accessing the disconnected wireless network according to the target beacon frame of the disconnected wireless network comprises:
- acquiring second access authentication information enrolled; and
- sending the second access authentication information to a wireless access point corresponding to the target beacon frame, wherein the second access authentication information is configured to connect the terminal device to a corresponding wireless network after the wireless access point corresponding to the target beacon frame authenticates the terminal device.

7. The method of claim 6, wherein acquiring the second access authentication information enrolled comprises:
- displaying an authentication information enrolling interface and a wireless access point identifier corresponding to the target beacon frame, and acquiring the second access authentication information enrolled by a user on the authentication information enrolling interface, when the at least one beacon frame is detected to comprise the target beacon frame.

8. The method of claim 6, wherein acquiring the second access authentication information enrolled comprises:
- acquiring pre-stored second access authentication information when the at least one beacon frame is detected to comprise the target beacon frame.

9. A terminal device, comprising:
- at least one processor; and
- a computer readable storage, coupled to the at least one processor and storing at least one computer executable instruction thereon which, when executed by the at least one processor, causes the at least one processor to:
  - determine a reason for disconnection between a wireless fidelity (Wi-Fi) module of a terminal device and a wireless network currently accessed when the Wi-Fi module is detected to be disconnected from the wireless network currently accessed, generate description information indicating the reason for disconnection between the Wi-Fi module and the wireless network currently accessed, and send the description information to the Wi-Fi module;
  - receive, via the Wi-Fi module, the description information, and receive and record at least one beacon frame within a first preset time period when the description information is determined to be matched with preset description information via the Wi-Fi module; and
  - access a disconnected wireless network according to a target beacon frame of the disconnected wireless network when the at least one beacon frame is detected to comprise the target beacon frame.

10. The terminal device of claim 9, wherein the at least one processor is further configured to:
- acquire wireless access point information corresponding to a wireless network when the Wi-Fi module of the terminal device is detected to access the wireless network, and add the wireless access point information to a pre-stored wireless access point information set, wherein the wireless access point information comprises a beacon frame corresponding to a wireless access point.

11. The terminal device of claim 10, wherein the disconnected wireless network comprises a wireless network corresponding to any wireless access point information in the pre-stored wireless access point information set.

12. The terminal device of claim 9, wherein the at least one processor is further configured to:
- send a probe request frame within a second preset time period when the at least one beacon frame is detected to comprise no target beacon frame of the disconnected wireless network;
- detect whether a probe response frame generated by a wireless access point in response to the probe request frame is received; and
- send first access authentication information to the wireless access point generating the probe response frame when the probe response frame generated by the wireless access point in response to the probe request frame is detected to be received, wherein the first access authentication information is configured to connect the terminal device to a wireless network corresponding to the wireless access point generating the probe response frame after the wireless access point generating the probe response frame authenticates the terminal device.

13. The terminal device of claim 9, wherein the at least one processor configured to receive and record the at least one beacon frame within the first preset time period is configured to:
- switch to a current channel when an identity (ID) of the current channel is unprocessed;
- receive, within the first preset time period, the at least one beacon frame on the current channel via the Wi-Fi module;
- record the at least one beacon frame received into a preset beacon frame set; and
- update the ID of the current channel to be unprocessed according to a channel list when the first preset time period has elapsed.

14. The terminal device of claim 9, wherein the at least one processor configured to access the disconnected wireless network according to the target beacon frame of the disconnected wireless network is configured to:
- acquire second access authentication information enrolled; and
- send the second access authentication information to a wireless access point corresponding to the target beacon frame, wherein the second access authentication information is configured to connect the terminal device to a corresponding wireless network after the wireless access point corresponding to the target beacon frame authenticates the terminal device.

15. The terminal device of claim 14, wherein the at least one processor configured to acquire the second access authentication information enrolled is configured to:
- display an authentication information enrolling interface and a wireless access point identifier corresponding to the target beacon frame, and acquire the second access authentication information enrolled by a user on the authentication information enrolling interface, when the at least one beacon frame is detected to comprise the target beacon frame.

16. The terminal device of claim 14, wherein the at least one processor configured to acquire the second access authentication information enrolled is configured to:
acquire pre-stored second access authentication information when the at least one beacon frame is detected to comprise the target beacon frame.

17. A non-transitory computer readable storage medium storing a computer program which, when executed by a processor, causes the processor to:
determine a reason for disconnection between a wireless fidelity (Wi-Fi) module of a terminal device and a wireless network currently accessed when the Wi-Fi module is detected to be disconnected from the wireless network currently accessed, generate description information indicating the reason for disconnection between the Wi-Fi module and the wireless network currently accessed, and send the description information to the Wi-Fi module;
receive, via the Wi-Fi module, the description information, and receive and record at least one beacon frame within a first preset time period when the description information is determined to be matched with preset description information via the Wi-Fi module; and
access a disconnected wireless network according to a target beacon frame of the disconnected wireless network when the at least one beacon frame is detected to comprise the target beacon frame.

18. The non-transitory computer readable storage medium of claim 17, wherein the processor is further configured to:
acquire wireless access point information corresponding to a wireless network when the Wi-Fi module of the terminal device is detected to access the wireless network, and add the wireless access point information to a pre-stored wireless access point information set, wherein the wireless access point information comprises a beacon frame corresponding to a wireless access point.

19. The non-transitory computer readable storage medium of claim 17, wherein the processor is further configured to:
send a probe request frame within a second preset time period when the at least one beacon frame is detected to comprise no target beacon frame of the disconnected wireless network;
detect whether a probe response frame generated by a wireless access point in response to the probe request frame is received; and
send first access authentication information to the wireless access point generating the probe response frame when the probe response frame generated by the wireless access point in response to the probe request frame is detected to be received, wherein the first access authentication information is configured to connect the terminal device to a wireless network corresponding to the wireless access point generating the probe response frame after the wireless access point generating the probe response frame authenticates the terminal device.

20. The non-transitory computer readable storage medium of claim 17, wherein the computer program executed by the processor to access the disconnected wireless network according to the target beacon frame of the disconnected wireless network is executed by the processor to:
acquire second access authentication information enrolled; and
send the second access authentication information to a wireless access point corresponding to the target beacon frame, wherein the second access authentication information is configured to connect the terminal device to a corresponding wireless network after the wireless access point corresponding to the target beacon frame authenticates the terminal device.

* * * * *